(12) United States Patent  
Pelletier

(10) Patent No.: US 6,690,883 B2
(45) Date of Patent: Feb. 10, 2004

(54) SELF-ANNOTATING CAMERA

(75) Inventor: Daniel Pelletier, Lake Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/017,576

(22) Filed: Dec. 14, 2001

(65) Prior Publication Data

US 2003/0113109 A1 Jun. 19, 2003

(51) Int. Cl.[7] .................. G03B 17/24; G03B 17/48; H04N 5/76
(52) U.S. Cl. .................. 396/321; 396/310; 396/311; 396/429; 348/231.3
(58) Field of Search .................. 396/310, 311, 396/312, 313, 314, 315, 316, 317, 318, 319, 321, 429; 348/231.3, 231.4, 231.5, 231.6, 552

(56) References Cited

U.S. PATENT DOCUMENTS

| | | | |
|---|---|---|---|
| 4,728,978 A | | 3/1988 | Inoue et al. |
| 4,825,233 A | | 4/1989 | Kanai et al. |
| 5,103,250 A | | 4/1992 | Arifuku et al. |
| 5,365,290 A | * | 11/1994 | Suzuki et al. .................. 396/26 |
| 5,506,644 A | * | 4/1996 | Suzuki et al. .................. 396/319 |
| 5,689,742 A | | 11/1997 | Chamberlain, IV |
| 5,737,491 A | | 4/1998 | Allen et al. |
| 5,768,640 A | | 6/1998 | Takahashi et al. .................. 396/310 |
| 5,809,520 A | * | 9/1998 | Edwards et al. .................. 711/115 |
| 5,913,078 A | * | 6/1999 | Kimura et al. .................. 396/50 |
| 6,208,353 B1 | | 3/2001 | Ayer et al. |
| 6,295,419 B1 | | 9/2001 | Kobayashi et al. |
| 6,337,951 B1 | * | 1/2002 | Nakamura .................. 396/57 |
| 6,459,388 B1 | * | 10/2002 | Baron .................. 340/996 |
| 6,463,426 B1 | * | 10/2002 | Lipson et al. .................. 707/3 |
| 6,545,705 B1 | * | 4/2003 | Sigel et al. .................. 348/157 |

FOREIGN PATENT DOCUMENTS

| | | | | |
|---|---|---|---|---|
| JP | 10-056610 | 4/1998 | | H04N/5/781 |
| JP | 11-017908 | 4/1999 | | H04N/1/21 |

* cited by examiner

*Primary Examiner*—Alan A. Mathews
(74) *Attorney, Agent, or Firm*—Gregory L. Thorne

(57) ABSTRACT

A self-annotating camera providing annotation relating to a photograph. The camera captures a desired field of view in a photograph, obtains information relating to the photograph via a plurality of information sources, produces annotation corresponding to the information obtained from the plurality of information sources, and utilizes the produced annotation to annotate at least one of a photograph and an electronic file associated with the photograph. At least one of the plurality of information sources is internal to the camera and at least one of the plurality of information sources is external to the camera.

11 Claims, 3 Drawing Sheets

410 — GEORGE EATING LUNCH IN THE SUN NEAR EIFFEL TOWER, PARIS, FRANCE 10/15/01

SELF-ANNOTATING CAMERA

FIELD OF THE INVENTION

The present invention relates generally to the field of photography, and more particularly to a self-annotating camera.

BACKGROUND OF THE INVENTION

Currently, digital photographs are typically produced with a cryptic filename, such as, e.g., 012202.img. This cryptic filename has little, if any, significance to the photographer. In a majority of the cases, the cryptic filename is of little use to the photographer because the filename does not reveal any information regarding the context and/or content of the photograph. This problem is somewhat alleviated by the fact that most filenames may be changed by the user, electronically. Moreover, in most cases, annotation of digital pictorial views can be effected by a computerized technique. For example, software programs are available which give the photographer the ability to manually annotate digital photographs.

Many cameras in the prior art have the capability of automatically printing the date and time on the photograph. For example, a data imprinting apparatus in a camera for imprinting data onto film, and imprinting means for imprinting data memorized by a memory means onto the film are disclosed in U.S. Pat. No. 5,103,250 to Arifuku et al. Also, a camera having an annotation system is disclosed in U.S. Pat. No. 5,689,742 to Chamberlain, IV.

Moreover, even in the limited number of cases where the camera has the ability to annotate the photograph and/or filename, the information available to the prior art cameras is limited. Additionally, the prior art cameras do not have the capability to automatically obtain meaningful information which may be printed on the photographs and/or incorporated into electronic files associated with the photograph.

Thus, a need exists for a self-annotating camera having the capability of obtaining and printing various pieces of information on photographs and/or obtaining and incorporating such information into electronic files associated with the photograph (e.g., a filename), wherein the information is relevant to identifying the context and/or content of the photograph.

SUMMARY OF THE INVENTION

The present invention provides a camera configured to automatically detect or otherwise obtain information relating to a photograph via multiple information sources, including at least one information source which is internal to the camera and at least one information source which is external to the camera. The camera is further configured to print at least a portion of the information on the photograph itself, or to utilize at least a portion of the information in generating a filename for the photograph or in an electronic file associated with the photograph, such as, e.g., a database associated with the photograph. The information includes, for example, the time and date that the photograph was taken, the geographic location in which the photograph was taken, weather conditions, the name(s) of any of the people in the photograph, etc.

In accordance with one aspect of the present invention, a method for use in conjunction with a camera for providing annotation relating to a photograph taken using the camera is disclosed. The method includes the steps of obtaining information relating to the photograph via a plurality of information sources, wherein at least one of the information sources is internal to the camera and at least one of the information sources is external to the camera, producing annotation corresponding to the information obtained from the plurality of information sources, and annotating at least one of a photograph and an electronic file associated with the photograph, utilizing the produced annotation.

These and other features and advantages of the present invention will become more apparent from the accompanying drawings and the following detailed description.

DETAILED DESCRIPTION OF THE INVENTION

The present invention provides a camera configured to automatically detect or otherwise obtain information relating to a photograph via multiple information sources, including at least one information source which is internal to the camera and at least one information source which is external to the camera. The camera is further configured to print at least a portion of the information on the photograph itself, or to utilize at least a portion of the information in generating a filename for the photograph or in an electronic file associated with the photograph, such as, e.g., a database associated with the photograph. The information includes, for example, the time and date that the photograph was taken, the geographic location in which the photograph was taken, weather conditions, the name(s) of any of the people in the photograph, etc.

The term "photograph" as used herein should be understood to include without limitation an image recorded on film, a digital image or other electronic image, or a developed photograph on paper or other medium.

Figure 1:
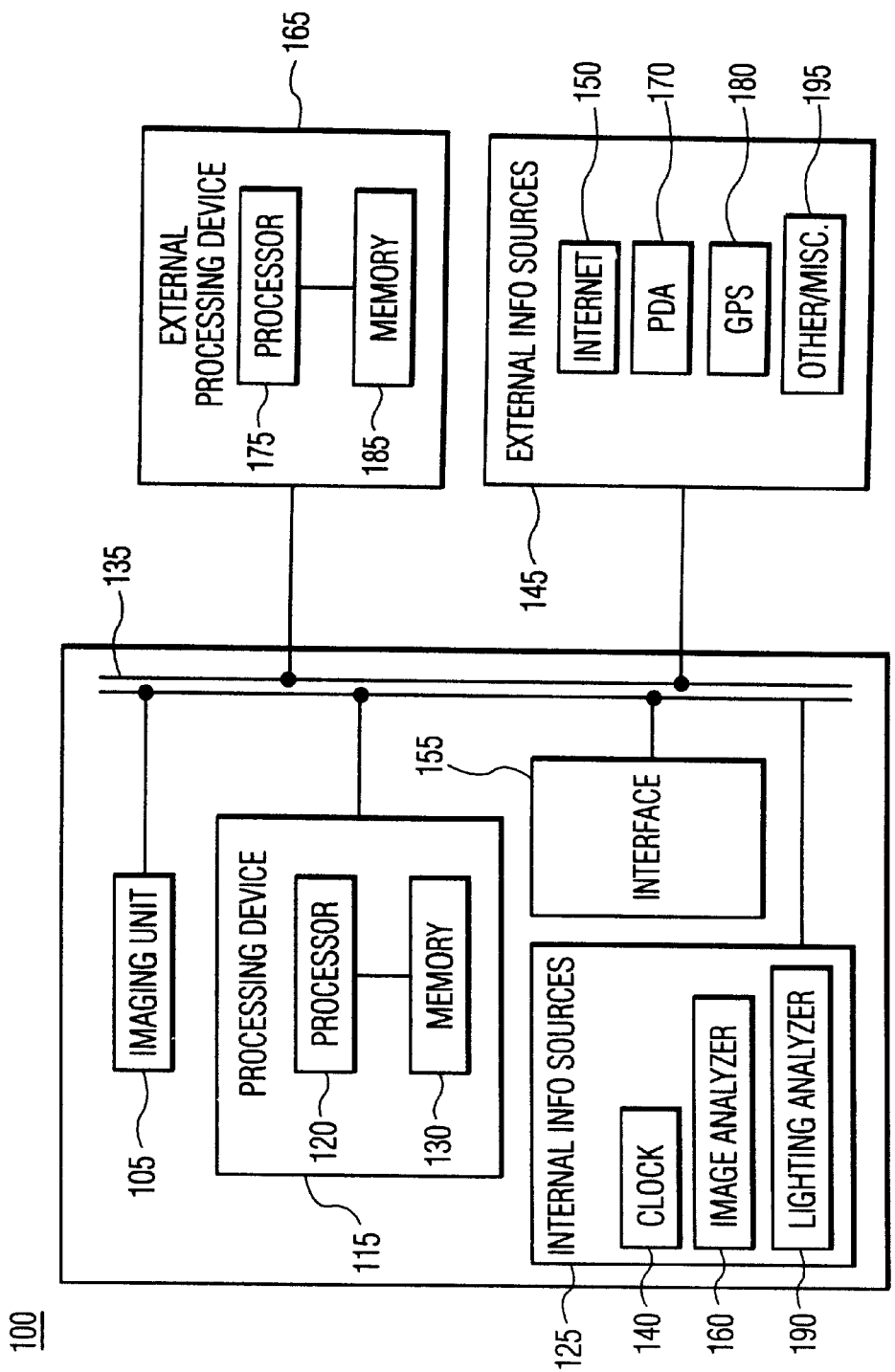
FIG. 1 is a block diagram of a camera system in accordance with an embodiment of the present invention.

Referring initially to FIG. 1, there is shown a block diagram illustrating a camera system 100 in accordance with the present invention. Camera system 100 includes a camera 110, respective internal and external processing devices 115 and 165, and respective internal and external information sources 125 and 145.

Camera 110 may be a digital camera or a more conventional camera utilizing film. In the case where camera 110 utilizes film, it is contemplated that camera 110 includes a data imprinting apparatus for imprinting information onto film, as is known to one having ordinary skill in the art. Where camera 110 is a digital camera, any information obtained by the camera system may be incorporated into a corresponding digital photograph, or the information may be used as identifying information in the filename or an associated database. In either case, camera 110 includes an imaging unit 105 for imaging a desired field of view and capturing the field of view in a photograph.

Processing devices 115 and 165 include respective processors 120, 165 and respective memories 130 and 185. Processors 120, 175 and memories 130, 185 may communicate over at least a portion of a set of one or more system buses 135, which are illustratively internal to the camera 110. Also utilizing at least a portion of the set of system buses 135 may be one or more network interface devices and/or other interface devices 155 configured to communicate with the information sources 125 and 145. The processors 120 and 175 may each represent a microprocessor, central processing unit (CPU), digital signal processor (DSP), or application-specific integrated circuit (ASIC), as well as portions or combinations of these and other processing devices. The memories 130 and 185 are typically electronic memories, but may comprise or include other types of storage devices, such as disk-based optical or magnetic memory.

The self-annotation techniques described herein may be implemented in whole or in part using software stored and executed using the respective processor and memory elements of the processing devices 115 and/or 165. For example, the self-annotation techniques may be implemented at least in part using one or more software programs stored in at least one of the memories 130 and 185 and executed by at least one of the processors 120 and 175. The particular manner in which such software programs may be stored and executed in device elements such as processors 120 and 175 and memories 130 and 185 is well understood in the art and therefore not described in detail herein.

It is therefore contemplated that camera 110 may provide the self-annotation techniques described herein using either processing device 115 housed within camera 110, or stand-alone processing device 165, or a combination of both devices 115 and 165.

Camera 110 and processing device 115 may communicate with the external information sources 145 and the external processing device 165 via wireless communication technology or any other type of communication technology known to one having ordinary skill in the art. For example, the camera 110 and processing device 115 may communicate with one or more of the external information sources 145 via cellular, IEEE 802.11b, Universal Serial Bus (USB) or Bluetooth types of network connections. It should be noted that different network connections may be used for different ones of the information sources. Such network connections provide standard techniques for querying the external information sources 145.

In operation, once a photograph is taken by the camera 110 (or while the photograph is being taken) an appropriate signal or signals may be sent to the plurality of information sources 125, 145 requesting information therefrom. The information can then be transferred to the photograph and/or the electronic file associated with the photograph, in the manner to be described below.

It is contemplated that the camera system 100 is configured to automatically annotate the film and/or electronic file associated with the photograph in accordance with the information received from the information sources 125, 145. However, it is further contemplated that the user has the ability to select which portions of information are transferred to the photograph or electronic file associated with the photograph. Additionally, once the information has been received from the information sources 125, 145, the user will have the ability to edit the information prior and/or subsequent to the information being transferred to the photograph and/or file. The ability to select and edit the information may be executed by, for example, utilizing push buttons on the camera or external software.

The information sources 125, 145 in this illustrative embodiment include a clock 140, the Internet 150, an image analyzer 160, a personal digital assistant (PDA) 170, a global positioning system (GPS) 180, a lighting analyzer 190 and a miscellaneous source 195. In this embodiment, information sources 140, 160 and 190 are internal to camera 110 and information sources 150, 170, 180 and 195 are external sources.

Clock 140 provides information regarding the date and time that the photograph was taken. This information is important for timestamping the photograph and also for interfacing with other information sources as will be described below. The clock 140 may draw power from a direct current (D.C.) power source of the camera 110.

The image analyzer 160 utilizes image analysis techniques of a type known to one having ordinary skill in the art. For example, the image analyzer 160 may be configured to determine the identity of people and pets, famous landmarks, weather conditions, certain activities being performed by the subjects in the photograph, and other contextual information.

Lighting analyzer 190 provides an indication to the camera 110 as to the level of the ambient lighting. Thus, the camera 110 can adjust to various lighting conditions. Lighting analyzer may also provide input to the camera such that the camera can annotate the photograph or electronic file associated with the photograph with information regarding the lighting conditions encountered by the subject within the photograph. For example, the lighting analyzer may be able to determine that it was a sunny day and provide annotation accordingly.

Camera 110 may include a port for interfacing directly with the PDA 170. A PDA commonly includes the user's personal schedule information by date and time. Therefore, since the camera 110 knows the date and time from clock 140, the camera 110 can access the information stored within PDA 170 regarding a particular date and time to obtain additional information which may be relevant to the context of the photograph. For example, the PDA 170 may indicate that the user is on vacation playing golf at Pebble Beach in California. Therefore, when the image analyzer 160 detects a golf course on a certain date and the PDA 170 indicates that the photographer is playing golf at Pebble Beach on that date, the camera will provide annotation on the photograph, or in an electronic file associated with the photograph, accordingly.

Camera 110 may also include a port for interfacing directly with the GPS 180. The GPS 180 will provide information to camera 110 regarding the location at which the photograph is being taken. Therefore, camera 110 will have the capability of annotating the photograph or file associated with the photograph with the location of the scene of the photograph (e.g., Monterey Peninsula, Calif.).

At least one additional source 195 is available to provide additional information to camera 110.

Figure 2:
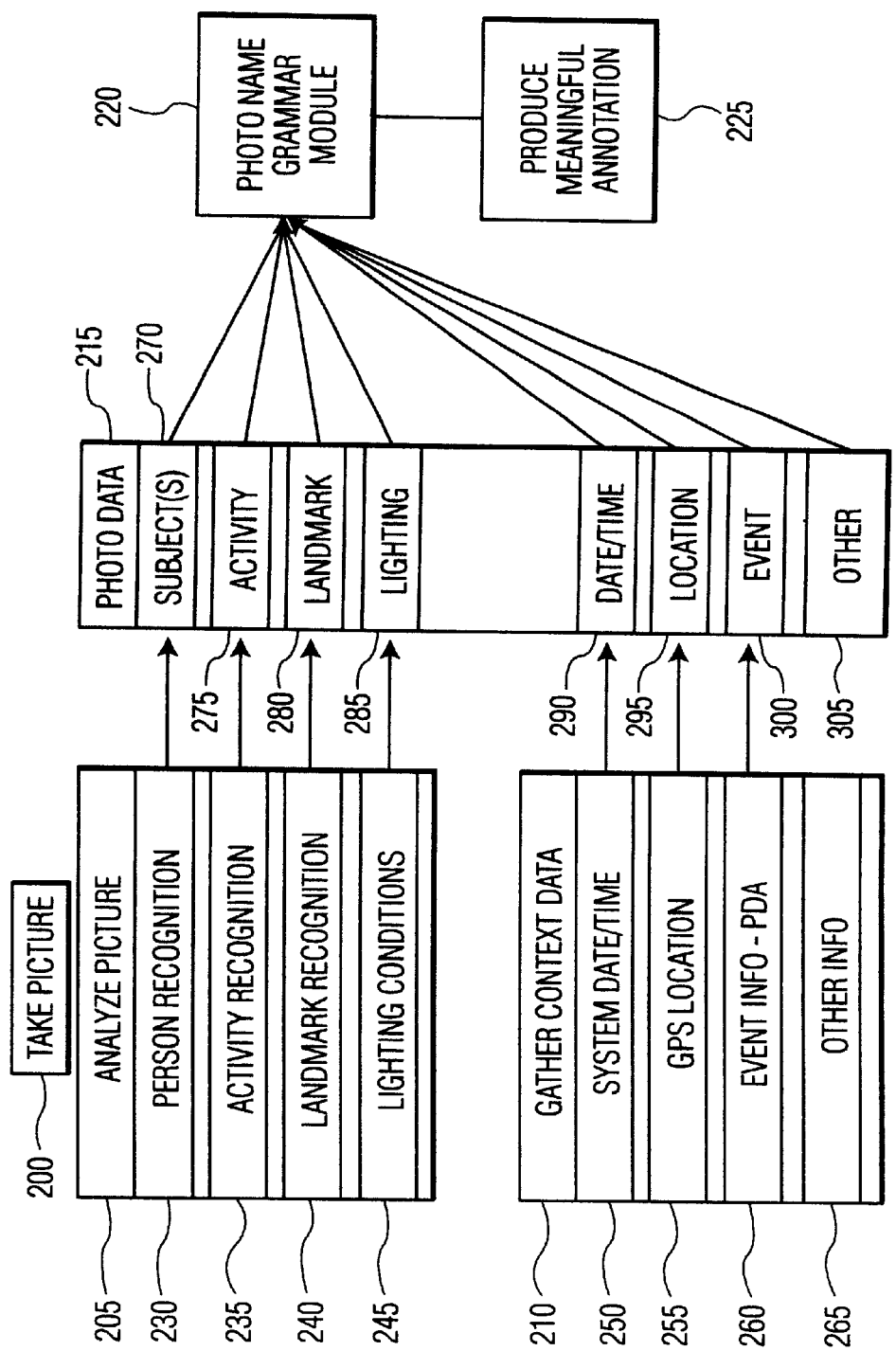
FIG. 2 is a flow diagram illustrating the steps of a method of automatically obtaining information associated with a photograph and annotating the photograph and/or an electronic file associated with the photograph in accordance with an embodiment of the present invention.

FIG. 2 is a flow diagram illustrating the steps of a method of automatically obtaining information associated with a photograph and annotating the photograph and/or an electronic file associated with the photograph in accordance with an illustrative embodiment of the present invention. The method includes six primary steps. The steps include taking the picture (step 200), analyzing the picture (step 205), gathering context data (step 210), assimilating the photo data (step 215), combining the photo data in a photo name grammar module (step 220), and producing a meaningful annotation (step 225).

The first step, taking the picture, i.e., step 200, includes all of the functions commonly associated with taking a picture, such as, e.g., pointing and focusing the camera on the subject and depressing a button on the camera to capture the subject on film or in a digital file.

Several tasks are performed within step 205 of analyzing the picture. The tasks include person recognition 230, activity recognition 235, landmark recognition 240 and lighting conditions analysis 245. Each of the first three tasks is performed by the image analyzer 160 illustrated and described with reference to FIG. 1. The image analyzer 160 downloads information to a database which is preferably stored in either memory 130, memory 185 or a combination of both. For example, the information associated with each photograph may form a record having several fields within a database stored in memory 130. The user preferably has the ability to select which fields, if any, should be utilized. In one embodiment, the image analyzer compares the subjects in the photograph with images that have been previously stored in a database. Additionally, keywords relating to weather conditions or significant events may be recorded in the database referred to above or a separate keyword database. Also, relationships such as "Bill equals Jim's brother" may be entered into the database. Thus, the image analyzer 160 becomes more useful and accurate as the database grows. As indicated previously, the lighting conditions may be evaluated via a sensor which is internal to camera 110.

Information such as the date and time 250, the GPS location 255, event information 260 from the PDA and other information 265 is obtained in the step 210 of gathering context data via one or more of the communication connections described above. The date and time 250 is obtained from the clock 140 which, as indicated previously, may be internal to the camera 110. The camera 110 obtains the location and event information from the GPS 180 and PDA 170, respectively. The camera 110 obtains the other information 265 from the other or miscellaneous information sources 195.

Once all of the information is collected in steps 205 and 210, it is assimilated as photo data in step 215. Thus, the photo data includes identities of the following information relating to the photograph: the subject(s) 270, the activity taking place 275, any landmarks 280, lighting conditions 285, the date and time 290, the location 295, event information 300 and any other information 305 which may be relevant to the identity of the photograph.

After all of the preceding information is combined and stored, e.g., in a designated database within memory 130, the information is made available to the photo name grammar module of step 220. It is within the photo name grammar module that the photo data 215 is processed in a fashion to organize the information such that annotation which provides identity and meaning to the photograph may be produced, e.g., so as to allow a viewer to readily identify the photograph.

Finally, a meaningful annotation is produced in step 225. The name may be utilized by a viewer and/or photographer to identify a filename and/or to annotate a photograph or an electronic file associated with the photograph.

Figures 3, 4:
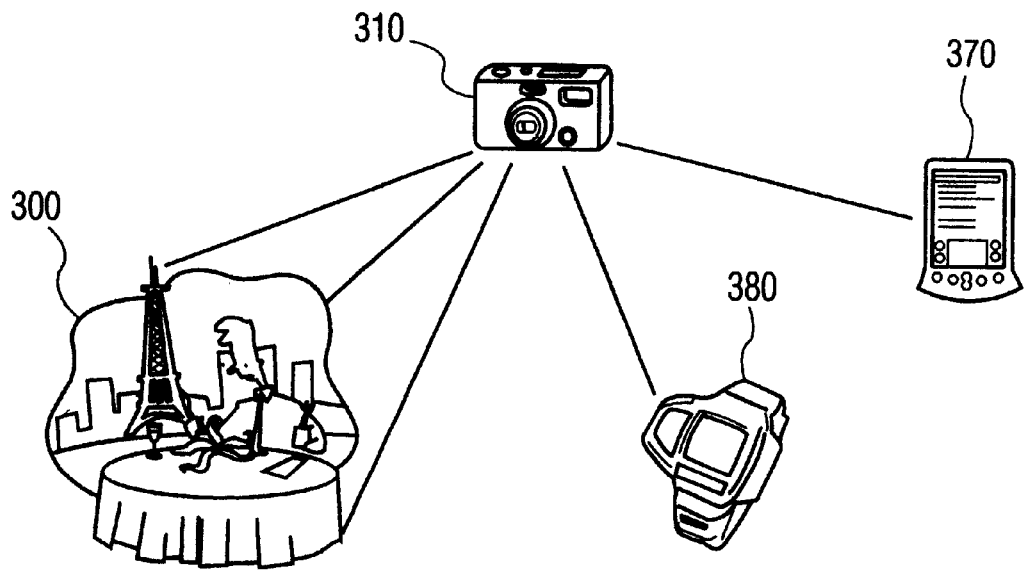
FIG. 3 is an illustrative embodiment of the present invention.
FIG. 4 is an example of information that may be obtained and utilized to annotate a photograph and/or an electronic file associated with the photograph in accordance with another embodiment of the present invention.

FIG. 3 is an illustrative embodiment of the present invention. A field of view 300 imaged by the camera 310 includes George eating lunch in the sun near the Eiffel Tower in Paris, France, on Oct. 15, 2001. In order to obtain that information, camera 310 must access multiple information sources in accordance with the present invention. For example, internal components of camera 310 may include a clock and an image analyzer, as described above. The clock informs camera 310 that the date is Oct. 15, 2001. The image analyzer analyzes the image 300 and determines that the landmark is the Eiffel Tower, that the weather is sunny, that the person is George and that George is eating. An entry within PDA 370 indicates that George would be taking a trip to France on Oct. 15, 2001. Additionally, GPS 380 confirms the fact that George is in Paris, France.

FIG. 4 is an example of information that may be used to annotate a photograph or an electronic file, in accordance with the FIG. 3 embodiment of the present invention. The information block 410 shown in FIG. 4 indicates that the photograph is one of "George eating lunch in the sun near the Eiffel Tower, Paris, France Oct. 15, 2001." The information contained in information block 410 was obtained by the camera 310 of FIG. 3 in accordance with the techniques of present invention. For example, the subject, George; the landmark, Eiffel Tower; the activity, eating lunch; and the weather condition, sun; each was identified by an image analyzer in the camera 310. The date, Oct. 15, 2001, was obtained through a system clock in the camera 310. Finally, the location, Paris, France, was obtained from either the PDA 370, the GPS 380 or a combination of both. The information contained in the box illustrated in FIG. 4 provides sufficient information for the viewer to properly identify the corresponding photograph.

The above-described embodiments of the invention are intended to be illustrative only. For example, additional information sources may be incorporated into or operatively connected to the camera to provide additional information regarding the context of the photograph. In addition, the particular arrangement of system elements shown in FIG. 1, and the particular method steps of FIG. 2, are shown by way of example. Alternative embodiments may use different arrangements of system elements and method steps. These and numerous other embodiments within the scope of the following claims will be apparent to those skilled in the art.

What is claimed is:

1. A method for use in conjunction with a digital camera for providing annotation relating to a digital photograph taken using the digital camera, the method comprising the steps of:

obtaining information relating to the digital photograph via a plurality of information sources, wherein at least one of the plurality of information sources is internal to the camera and at least one of the plurality of information sources is an external information source for obtaining information external to the camera;

producing annotation corresponding to at least the information obtained from the plurality of external information source sources; and annotating at least one of a photograph and an electronic file filename associated with the digital photograph, utilizing the produced annotation, wherein the plurality of information sources includes at least a global positioning system and a personal digital assistant.

2. The method as recited in claim 1 further comprising the step of submitting the information obtained from the plurality of information sources to a grammar module to organize the information such that grammatically correct annotation which provides identity and meaning to the photograph may be produced from said information.

3. The method as recited in claim 1 wherein the annotating step further comprises the step of printing the annotation on the photograph.

4. The method as recited in claim 1 wherein the annotating step further comprises the step of annotating a database linked to the photograph.

5. The method as recited in claim 1 wherein the plurality of information sources comprises at least one of an image analyzer, a global positioning system, a personal digital assistant, and a clock.

6. The method as recited in claim 1 wherein the camera comprises a processing device having a processor and associated memory for implementing the steps of the method.

7. The method as recited in claim 1 wherein information obtained from the global positioning system and personal digital assistant are combined to form at least a portion of the annotation used to annotate at least one of the photograph and the electronic file filename associated with the photograph.

8. An article of manufacture for use in conjunction with a digital camera for providing annotation relating to a digital photograph taken using the digital camera, the article comprising a machine readable medium containing one or more programs which when executed implement the steps of:

obtaining information relating to the digital photograph via a plurality of information sources, wherein at least one of the plurality of information sources is internal to the camera and at least one of the plurality of information sources is an external information source for obtaining information external to the camera;

producing annotation corresponding to at least the information obtained from the plurality of external information source sources; and annotating at least one of a photograph and an electronic file filename associated with the digital photograph, utilizing the produced annotation, wherein the plurality of information sources includes at least a global positioning system and a personal digital assistant.

9. A method for use in conjunction with a camera for providing annotation relating to a photograph taken using the camera, the method comprising the steps of:

obtaining information relating to the photograph via a plurality of information sources, wherein at least one of the plurality of information sources is internal to the camera and at least one of the plurality of information sources is external to the camera;

producing annotation corresponding to the information obtained from the plurality of information sources;

annotating at least one of a photograph and an electronic file associated with the photograph, utilizing the produced annotation; and submitting the information obtained from the plurality of information sources to a grammar module to organize the information such that grammatically correct annotation which provides identity and meaning to the photograph may be produced from said information.

10. A method for use in conjunction with a camera for providing annotation relating to a photograph taken using the camera, the method comprising the steps of:

obtaining information relating to the photograph via a plurality of information sources, wherein at least one of the plurality of information sources is internal to the camera and at least one of the plurality of information sources is external to the camera, wherein the plurality of information sources includes at least a global positioning system and a personal digital assistant;

producing annotation corresponding to the information obtained from the plurality of information sources; and annotating at least one of a photograph and an electronic file associated with the photograph, utilizing the produced annotation.

11. A method for use in conjunction with a camera for providing annotation relating to a photograph taken using the camera, the method comprising the steps of:

obtaining information relating to the photograph via a plurality of information sources, wherein at least one of the plurality of information sources is internal to the camera and at least one of the plurality of information sources is external to the camera, wherein at least one of the plurality of information sources comprises an image analyzer;

producing annotation corresponding to the information obtained from the plurality of information sources; and annotating at least one of a photograph and an electronic file associated with the photograph, utilizing the produced annotation, wherein the plurality of information sources includes at least a global positioning system and a personal digital assistant.

* * * * *